(12) United States Patent  
Gingrich et al.

(10) Patent No.: US 9,284,921 B2
(45) Date of Patent: Mar. 15, 2016

(54) POWERTRAIN FOR HYBRID VEHICLE HAVING DEDICATED EGR

(71) Applicant: Southwest Research Institute, San Antonio, TX (US)

(72) Inventors: Jess W. Gingrich, San Antonio, TX (US); Daniel W. Stewart, Helotes, TX (US); Terrence F. Alger, II, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 93 days.

(21) Appl. No.: 14/318,652

(22) Filed: Jun. 29, 2014

(65) Prior Publication Data

US 2015/0377188 A1  Dec. 31, 2015

(51) Int. Cl.
*F02M 25/07* (2006.01)
*F02B 47/08* (2006.01)
*F02D 41/00* (2006.01)
*F02B 61/00* (2006.01)
*F02B 63/04* (2006.01)

(52) U.S. Cl.
CPC ............ *F02M 25/0749* (2013.01); *F02B 47/08* (2013.01); *F02B 61/00* (2013.01); *F02B 63/042* (2013.01); *F02D 41/0047* (2013.01)

(58) Field of Classification Search
CPC ............ F02M 25/07; F02M 25/0749; F02M 35/10222; F02B 63/042; F02B 61/00; F02B 47/08; F02B 47/10; F02D 41/0047; F02D 41/005; F02D 41/0052
USPC ............ 123/568.11, 198 F; 701/108; 60/602
See application file for complete search history.

(56) References Cited

U.S. PATENT DOCUMENTS

| | | | | |
|---|---|---|---|---|
| 7,721,541 B2 * | 5/2010 | Roberts, Jr. | ............ | F02D 25/00 123/568.11 |
| 8,291,891 B2 * | 10/2012 | Alger, II | ............ | F02D 13/0238 123/315 |
| 8,893,687 B2 * | 11/2014 | Gingrich | ............ | F02D 41/0065 123/315 |
| 8,944,034 B2 * | 2/2015 | Gingrich | ............ | F02B 27/0215 123/315 |
| 2012/0000448 A1 * | 1/2012 | Freund | ............ | F02M 25/0749 123/568.21 |
| 2012/0204845 A1 * | 8/2012 | Gingrich | ............ | F02M 25/0707 123/568.17 |

* cited by examiner

*Primary Examiner* — Lindsay Low
*Assistant Examiner* — Grant Moubry
(74) *Attorney, Agent, or Firm* — Livingston Law Firm (57) ABSTRACT

Various methods and systems may be used to provide recirculated engine exhaust to an engine of a hybrid powertrain. It is assumed that the engine is equipped with a dedicated EGR loop. At least one cylinder is operated as a dedicated exhaust gas recirculation (EGR) cylinder, such that all exhaust of that cylinder is recirculated to the fresh air intake of the engine via the EGR loop. One or more cylinders are operated as main cylinders, such that exhaust from those cylinders exits the engine to the atmosphere. The engine itself is operable for at least part of its operation in a decoupled mode in which the dedicated EGR cylinder is mechanically decoupled from the engine crankshaft. During this decoupled mode, the dedicated EGR cylinder powers a generator. The main cylinders are operable exclusively to provide power to the crankshaft.

19 Claims, 6 Drawing Sheets

POWERTRAIN FOR HYBRID VEHICLE HAVING DEDICATED EGR

TECHNICAL FIELD OF THE INVENTION

This invention relates to powertrains for hybrid vehicles (internal combustion engine and electric generator/motor), and more particularly to such vehicles equipped for dedicated exhaust gas recirculation (EGR).

BACKGROUND OF THE INVENTION

For many internal combustion engines, their engine control strategy has three important parameters: spark timing (or fuel injection timing in a diesel engine), the exhaust gas recirculation (EGR) rate and the air/fuel ratio (AFR). To implement EGR, a fraction of the exhaust gas is recycled from the exhaust system back to the intake system. The recirculated exhaust gas is mixed with the fresh fuel-air mixture before entering the cylinders.

EGR has a long history of use in both diesel and spark-ignited engines for reduction of NOx emissions. It affects combustion in several ways. The combustion is cooled by the presence of exhaust gas, that is, the recirculated exhaust gas increases the charge heat capacity. The dilution of the oxygen present in the combustion chamber reduces the production of NOx, primarily by reducing the adiabatic flame temperature.

One approach to implementing EGR is with one or more dedicated EGR cylinders. In a "dedicated EGR" engine, the one or more dedicated cylinders are used to generate exhaust gas, all of which is dedicated to recirculation. The dedicated EGR may be produced by a cylinder having a single exhaust port that opens only to an EGR loop. The other cylinders produce "normal" exhaust, i.e., exhaust that exits the engine via one or more exhaust aftertreatment devices. U.S. Pat. No. 8,291,891, entitled "EGR System with Dedicated EGR Cylinders", to Alger, et al., and U.S. Pat. No. 8,561,599 entitled "EGR Distributor Apparatus for Dedicated EGR Configuration", to Gingrich et al., both describe systems that generate dedicated EGR in this manner and are incorporated by reference herein.

A feature of dedicated EGR is that the composition of the dedicated EGR exhaust gas may be controlled to be different from that of the exhaust of the non-dedicated cylinders. For example, in a gasoline engine, the dedicated EGR cylinder(s) may be run rich to provide EGR that improves combustion on all cylinders. With dedicated EGR, the quality of the recirculated exhaust can be improved by increased in-cylinder reforming of gasoline to H2 and CO. Subsequent combustion of this exhaust by the engine is thereby enhanced.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to systems and methods for using dedicated EGR with hybrid vehicle powertrains. As stated in the Background, in a "dedicated EGR" engine, one or more of the engine's cylinders is used to generate exhaust gas to be recirculated to the intake charge of the entire engine. Various embodiments of the invention improve the powertrain efficiency, improve vehicle thermal management, and improve combustion management with variable dilution and reformate rates.

As used herein, a "hybrid powertrain" is a vehicle powertrain having both an internal combustion engine and a generator that charges a battery and/or powers an electric motor. Various hybrid configurations are possible.

A feature of the following embodiments is that, as compared to dedicated EGR used with conventional internal combustion engines, the dedicated EGR cylinder(s) in a hybrid powertrain may operate in a manner that is mechanically decoupled from the other cylinders. When dedicated EGR is used with a conventional internal combustion engine, the engine's crankshaft constrains the speed that the engine can operate to that of the drivetrain before the transmission. Therefore, the mass flow through the dedicated EGR cylinder, and hence the EGR rate, are constrained.

The various hybrid powertrain embodiments described below overcome these constraints. In each embodiment, the dedicated EGR cylinder may be mechanically decoupled from the mechanical coupling of the main cylinders to the engine crankshaft. As described in connection with the various embodiments herein, this decoupling may occur during all operation of the engine for one or more designated EGR cylinders, or part time, or selectively for any of the cylinders. This decoupled mode of operation is referred to herein as "mechanically decoupled" operation of the dedicated EGR cylinder. When decoupled from the main cylinders, the dedicated EGR cylinder(s) provide power to an electric generator. The generator may then charge batteries and/or power a motor, depending on the particular type of hybrid vehicle.

A hybrid powertrain equipped with one or more decoupled dedicated EGR cylinders can deliver varying levels of EGR to the engine. The varying EGR levels can be accomplished while maintaining a closed EGR circuit, which provides all the benefits of in-cylinder fuel reformation. The dedicated EGR cylinder(s) can be operated for optimum levels of dilution and reformate, and at speeds determined by vehicle efficiency rather than by the speed of the main cylinders.

Reformate from a dedicated EGR cylinder added to the main cylinders improves ignitability of dilute combustion mixtures, thereby allowing more dilution tolerance. The reformate also accelerates combustion even as turbulence decreases when operating high efficiency cycles such as a Miller cycle or Atkinson cycle. This synergy between dedicated EGR and a hybrid powertrain also provides electrical and thermal management of the hybrid drive system using start-stop and in-use electrical power generation.

The dedicated EGR cylinder can be operated over an expanded cycle to lower exhaust temperature and reduce cooling demands. It can be operated with an exhaust valve opening strategy that uses multiple opening events during the expansion and exhaust strokes to suppress pressure pulsations and temporal dilution level variations. It can receive its inducted charge before intake compression occurs, after compression, with stoichiometric dilution or with dilution enhanced with reformed fuel.

Powertrain with Dedicated EGR Cylinder Fully Decoupled from Main Cylinders

Figure 1:
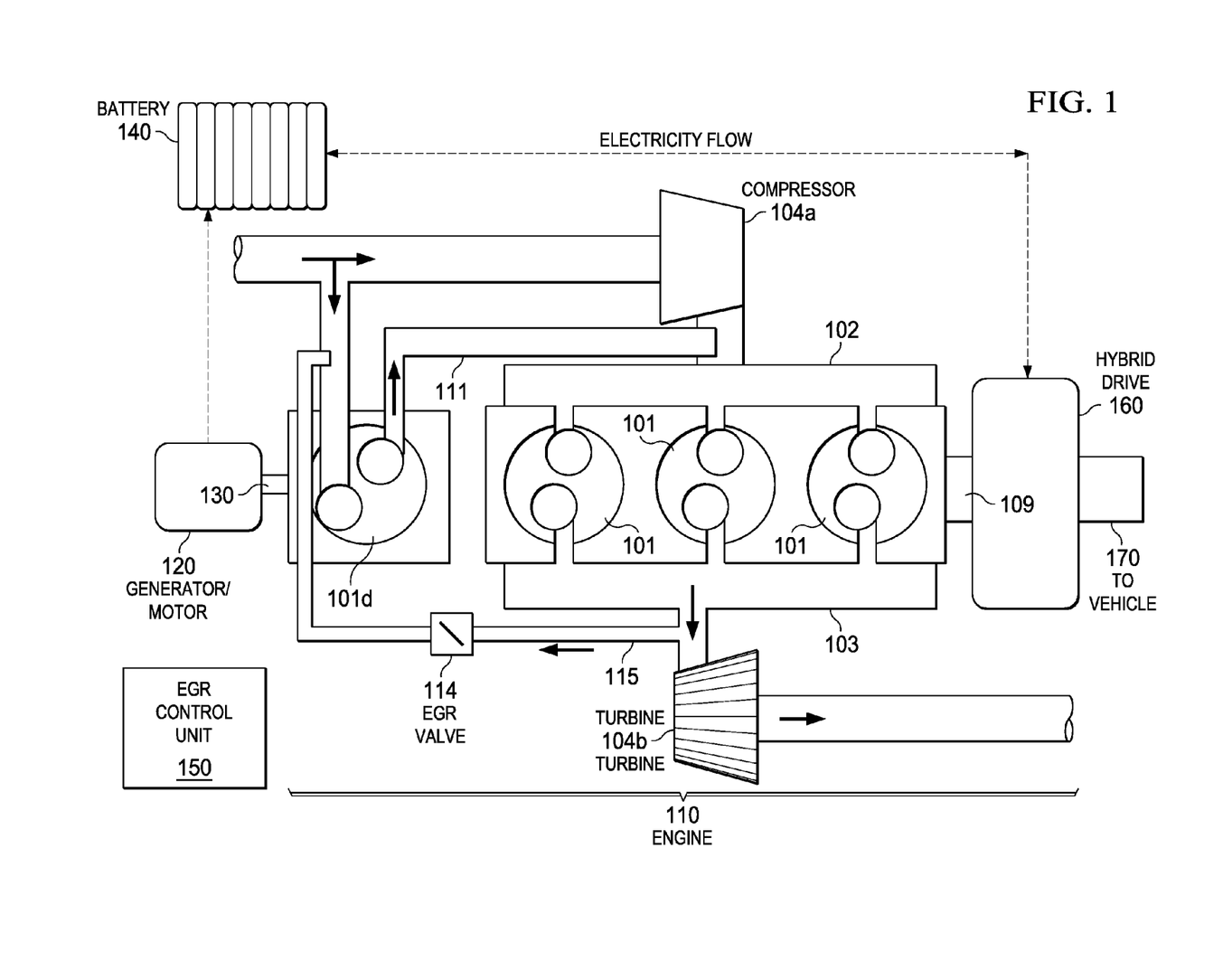
FIG. 1 illustrates a powertrain for a hybrid vehicle with dedicated EGR, with the dedicated EGR cylinder fully decoupled from the main cylinders.

FIG. 1 illustrates a powertrain having both an internal combustion engine 110 and a generator/motor 120. Both engine 110 and generator/motor 120 deliver power to the vehicle's wheels via a hybrid drive system 160.

The internal combustion engine 110 has four cylinders 101. One of the cylinders is a dedicated EGR cylinder, and is identified as cylinder 101d. The other cylinders 101 deliver power to the hybrid drive system 160 via a crankshaft 109.

In the example of this description, engine 110 is spark-ignited, with each cylinder 101 having an associated spark plug, and its "normal" air-fuel ratio is stoichiometric. However, the methods described herein are also suitable for use with compression-ignited engines. In general, the engine's non-dedicated EGR cylinders 101 can be operated with whatever air-fuel ratio is appropriate for the engine.

The dedicated EGR cylinder 101d may be operated at any desired air-fuel ratio. All of its exhaust is recirculated back to the intake manifold 102. The exhaust of the other three cylinders 101 (referred to herein as the "non dedicated" or "main" cylinders) is directed to an exhaust system via an exhaust manifold 103.

Engine 110 is equipped with a turbocharger, specifically a compressor 104a and a turbine 104b. Although not explicitly shown, all cylinders 101 have some sort of fuel delivery system for introducing fuel into the cylinders. This fuel delivery system can be fumigated, port injected, or direct injected.

In the example of this description, the EGR line 111 joins the fresh air intake line downstream the compressor 104a. A throttle (not shown) is used to control the amount of intake (fresh air and EGR) into the intake manifold 102.

In other embodiments, there may be a different number of engine cylinders 101, and/or there may be more than one dedicated EGR cylinder 101d. In general, in a dedicated EGR engine configuration, the exhaust of a sub-group of cylinders is routed back to the intake of all the cylinders, thereby providing EGR for all cylinders.

After entering the main cylinders 101, the fresh-air/EGR mixture is ignited and combusts. After combustion, exhaust gas from each cylinder 101 flows through its exhaust port and into exhaust manifold 103. From the exhaust manifold 103, exhaust gas then flows through turbine 104b, which drives compressor 104a. After turbine 104b, exhaust gas flows to an exhaust aftertreatment system (not shown), to be treated before exiting to the atmosphere via the tailpipe.

The dedicated EGR cylinder may receive a different intake of fresh air, fuel, and optionally recirculated exhaust, from that of the main cylinders. If a dedicated EGR cylinder 101d is run rich of stoichiometric, a significant amount of hydrogen (H2) and carbon monoxide (CO) may be formed. In many engine control strategies, this enhanced EGR is used to increase EGR tolerance by increasing burn rates, increasing the dilution limits of the mixture and reducing quench distances. In addition, the engine may perform better at knock limited conditions, such as improving low speed peak torque results, due to increased EGR tolerance and the knock resistance provided by hydrogen (H2) and carbon monoxide (CO).

As shown in FIG. 1, an EGR loop 115 may provide the dedicated EGR cylinder 101d with stoichiometric EGR from the main cylinders 101. An EGR valve 114 may be used to control the level of burned gas recirculation (without reformate) into the EGR cylinder 101d.

The dedicated EGR cylinder 101d is not mechanically connected to the power cylinders 101 of the engine. Instead, the dedicated EGR cylinder 101d is balanced on its own crankshaft 130, which is connected to electric motor/generator 120.

The dedicated EGR cylinder 101d can operate at an optimum speed (rpm) for EGR production and electric generation efficiency. The main cylinders 101 can operate as the vehicle requires. The main and dedicated EGR cylinders' valve timing and displacement can be optimized independently because they are not on the same crankshaft or camshaft.

All the dedicated EGR exhaust from cylinder 101d (combustion products and reformate) is delivered to the main cylinders 101 in a closed circuit. The EGR flow rate can be manipulated via valve timing, EGR flow and engine speed.

The dedicated EGR cylinder 101d can have a fresh air intake common with the main cylinders 101, introduced upstream of the introduction of the dedicated EGR into the fresh air, either before or after compressor 104a.

Generator/motor 120 delivers power to a battery system 140. Various configurations may be used to deliver power to the vehicle's wheels via hybrid drive system 160. Generator 120 may also act as the starter for the dedicated EGR cylinder 101d.

Because dedicated EGR cylinder 101d is decoupled from the main cylinders 101, it can have any desired bore/stroke/valve timing. It can operate on any fuel independently of the main cylinders. However, it can also be designed to operate in common with the main cylinders 101.

An EGR control unit 150 has appropriate hardware (processing and memory devices) and programming for performing the methods described herein. In particular, the control unit determines the operation of the EGR cylinder, as described above. In addition, control unit 150 may perform other tasks, such as overall EGR control, and may be integrated with a comprehensive engine control unit.

Figure 2:
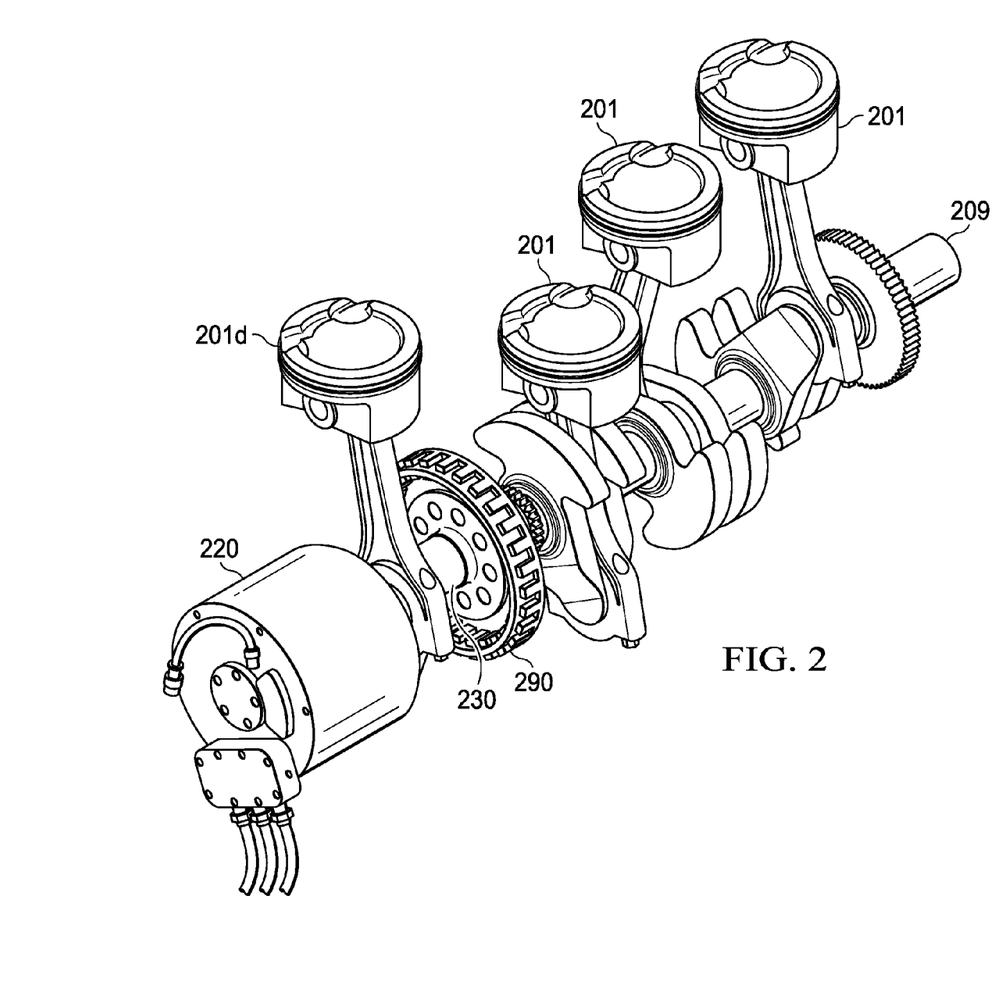
FIG. 2 illustrates a powertrain for a hybrid vehicle with dedicated EGR, with the dedicated EGR cylinder selectively decoupled from the main cylinders.

Hybrid Powertrain with Dedicated EGR Cylinder and Part Time Decoupling from Main Cylinders FIG. 2 illustrates how a dedicated EGR cylinder 201d can have a "quasi coupled" (selectively controlled) mechanical link to deliver power to the vehicle's wheels. As explained below, during operation of the hybrid powertrain, the dedicated EGR cylinder 201d sometimes provides power to the main crankshaft 209 supplemental to the power provided by the main cylinders 201. However, depending on vehicle operating conditions, dedicated EGR cylinder 201d may be decoupled such that it provides power to an electric generator 220.

FIG. 2 illustrates those elements of the powertrain relevant to coupling of the cylinders 201 to a crankshaft, and the selective decoupling of the dedicated EGR cylinder 201d. Other than these coupling mechanisms, and although not explicitly shown, the powertrain of FIG. 2 has elements similar to those of FIG. 1. In particular, dedicated EGR cylinder 101d has a closed EGR loop like that of FIG. 1.

In the example of FIG. 2, the crankshaft 230 of the dedicated EGR cylinder 101d is coupled to the main crankshaft 109 via a clutch or similar coupling 290. An example of a suitable clutch is a Sprague (over-run) clutch. The number of cylinders selected to be D-EGR producing cylinders is flexible, and the clutch 290 can be included between any number of cylinders. The coupling 290 can be further mechanically connected to an electric motor generator, via a planetary gear set, torque converter or other mechanical power transfer device.

Figure 3:
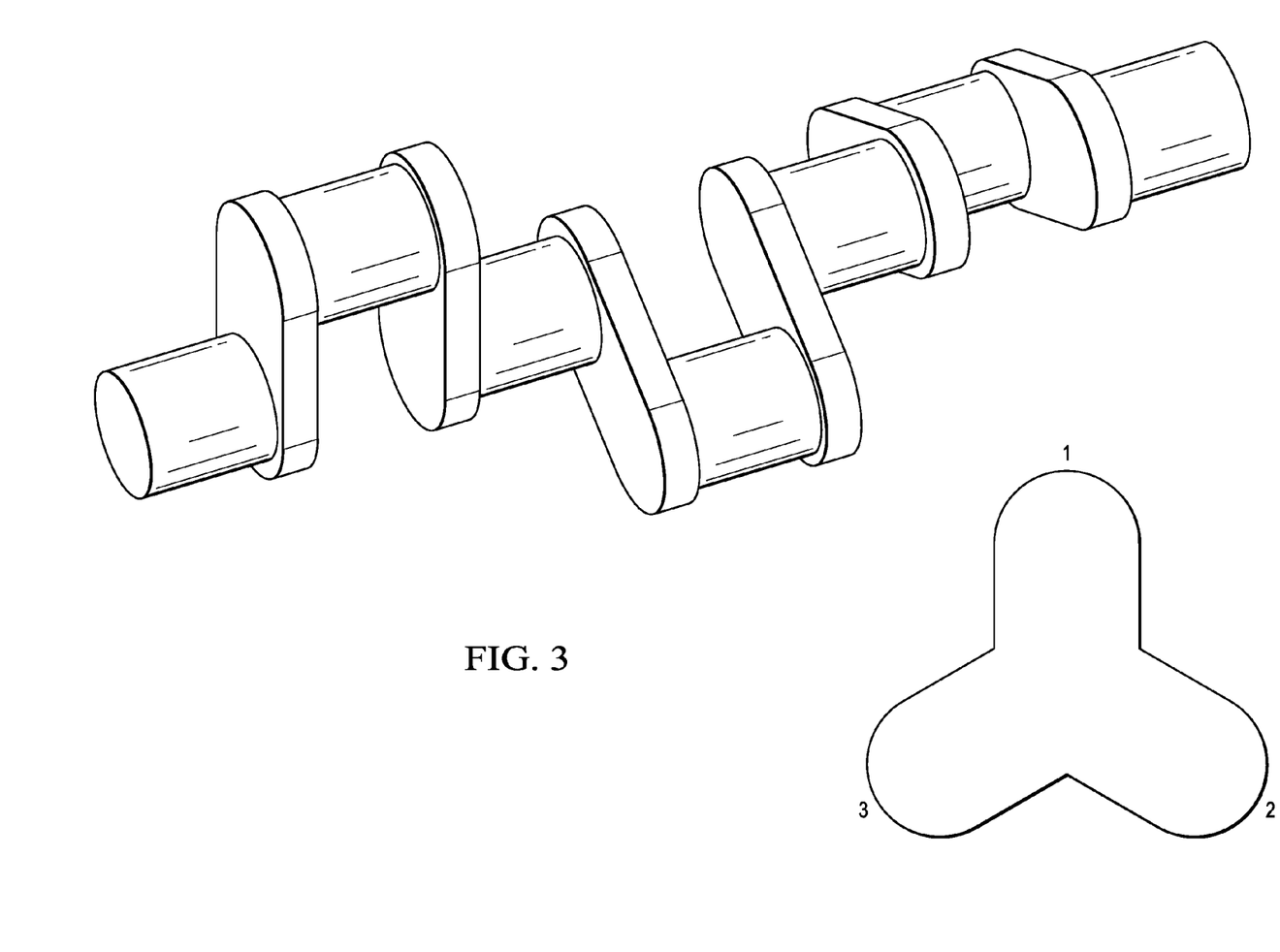
FIG. 3 illustrates how the main cylinders of FIG. 2 are balanced to the crankshaft.

As illustrated in FIG. 3, for a four cylinder quasi-coupled dedicated EGR, the three main cylinders have a 120 degree crank for torque balancing. In other words, the main cylinders are balanced to the crankshaft according to the number of main cylinders, rather than the total number (main and dedicated EGR) cylinders. As explained below, when the dedicated EGR cylinder is coupled to the main cylinders (and to their crankshaft), various balancing techniques can be used.

Referring again to both FIGS. 1 and 2, control of the dedicated EGR cylinder and the determination of whether or not it is to be coupled to the engine crankshaft, is determined by EGR control unit. At any point where the dedicated EGR cylinder 201d is operating at a slower speed (governed by the electric generator load) than the main crankshaft 209, clutch 290 can be disengaged. In this mode, the engine operates as described above in connection with FIG. 1, with a decoupled dedicated EGR cylinder. The mass flow through the dedicated EGR cylinder 201d can be decreased by operating at a slower speed, or increased by sourcing the inlet air for the dedicated EGR cylinder 201d from after the compressor, but before the D-EGR is introduced. This, in addition to valve timing, can increase volumetric efficiency above that of the main cylinders and generate EGR greater than 25%.

At vehicle operating conditions where a direct mechanical link would be a more efficient means to deliver power to the vehicle's drive system, the speed of the dedicated EGR cylinder 201d can be increased until it matches that of the main crankshaft 209. Power will be transferred to the main crankshaft 209 via clutch 290.

When the dedicated EGR cylinder 201d is engaged with the main crankshaft 209, the torque pulses on the 120 degree crank will not be symmetric. However, power electronics of the motor/generator 220 can provide torque pulses electrically to balance the main crankshaft. Also, when the dedicated EGR cylinder 201d is engaged with the main crankshaft 209, the amount of EGR and reformate can be modulated by relative valve timing.

The quasi-coupled dedicated EGR powertrain can include an electro-mechanical coupling mechanism that can transfer torque to the drive system from the electric motor and/or dedicated EGR cylinder 201d, regardless of input and output shaft speeds. This allows the dedicated EGR cylinder 201d to operate at an optimum speed for reformate and dilution production for the main cylinders 201. The dedicated EGR cylinder 201d can also transfer power to the drive line more directly than if it were charging a battery.

The quasi-coupled dedicated EGR system of FIG. 2 is not limited to a specific number of cylinders. There may be more than one dedicated EGR cylinder, and any number of main cylinders.

Figure 4:
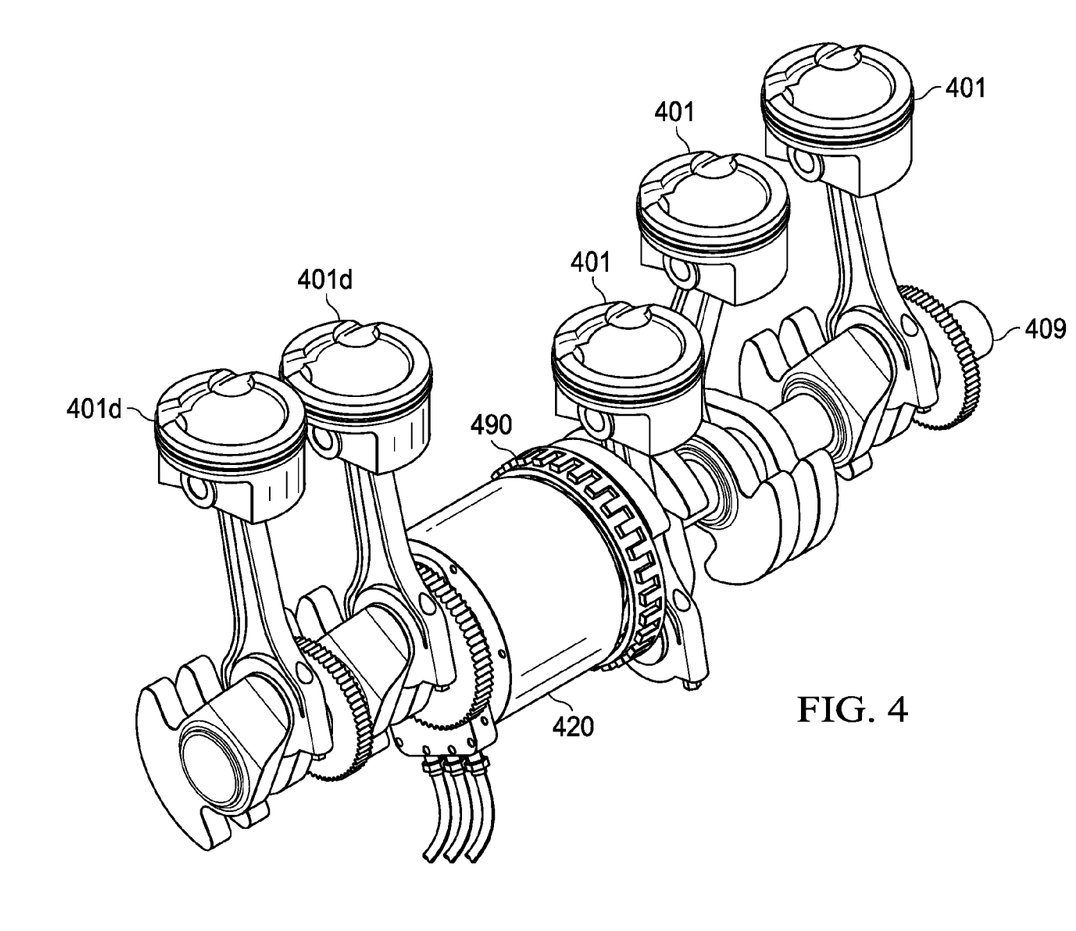
FIG. 4 illustrates a powertrain like that of FIG. 2, but with two dedicated EGR cylinders and three main cylinders.

FIG. 4 illustrates a hybrid powertrain having two quasi-coupled dedicated EGR cylinders 401d and three main cylinders 401. In other respects, the powertrain is like that of FIG. 2. The power transfer mechanism 490 allows the cylinders 401 on either side to operate at independent rotational speeds, but can transfer power either electrically through the generator 420 or mechanically through the crankshaft 409.

Figure 5:
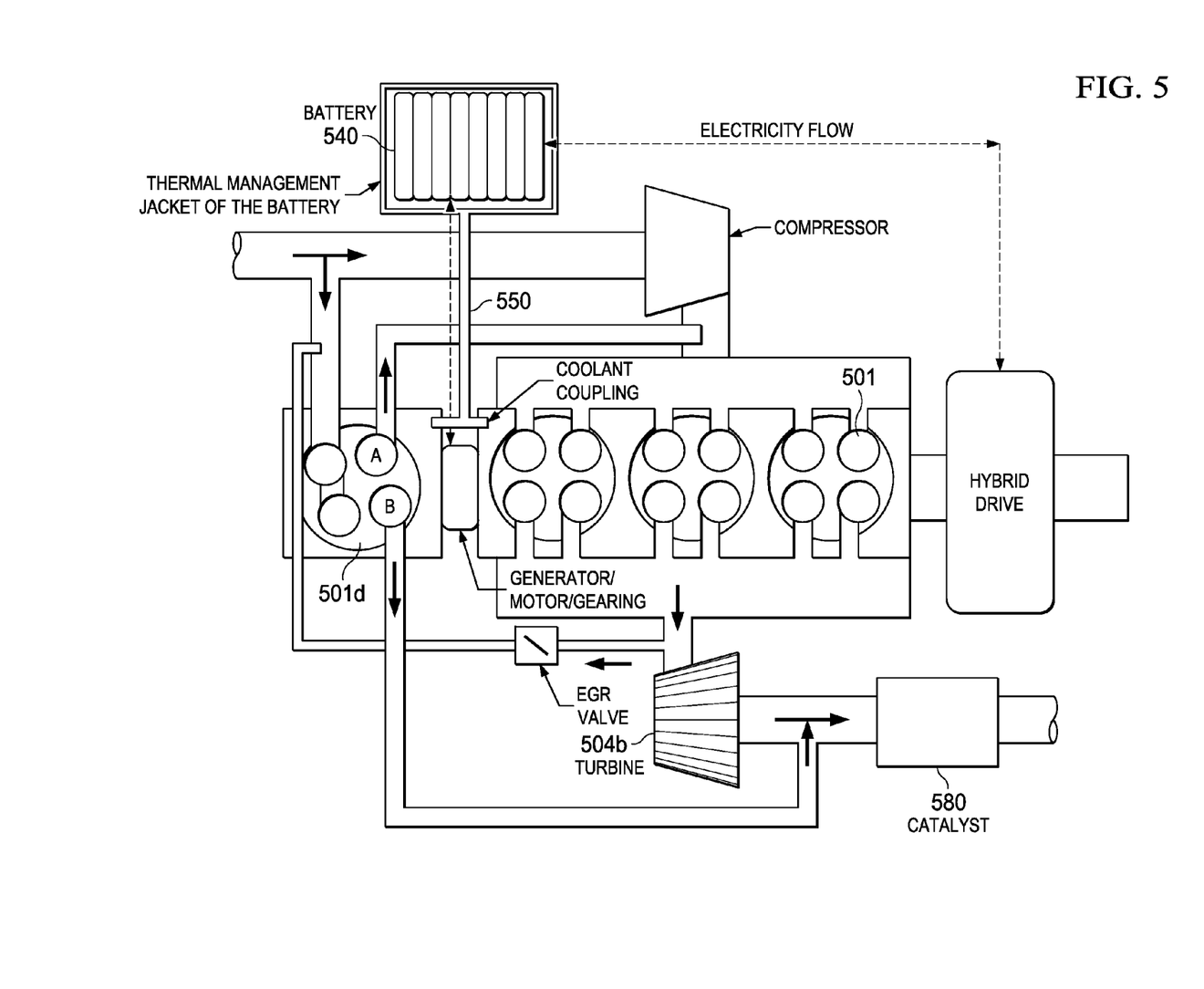
FIG. 5 illustrates a modification of the powertrain of FIG. 2, but which has two exhaust ports in the cylinder head for each of the main and dedicated EGR cylinders.

FIG. 5 illustrates a modification of the quasi-coupled dedicated EGR powertrain, which uses two exhaust ports in the cylinder head for each of the main and dedicated EGR cylinders. Each exhaust port is independently valved to a different output circuit. The dedicated EGR cylinder 501d can use the separate exhaust ports to direct exhaust flow to two different locations. As indicated by exhaust port A, exhaust can be recirculated to the engine intake. As indicated by exhaust port B, exhaust can be directed to the exhaust system upstream the emission control device(s) 580. The exhaust valves can be used independently of each other so that all exhaust is routed to one or the other location. Or, they can be used in unison such that the phasing of the valve openings can be controlled to proportionally direct flow to both locations.

In the embodiment of FIG. 5, if the dedicated EGR cylinder 501d is operated independently of the main cylinders 501, exhaust from the dedicated EGR cylinder 501d can be used to heat up the aftertreatment device 580 faster by bypassing the turbine 504b. A heat exchange passage 550 can route rejected cylinder heat to heat the oil and coolant of the main cylinders before they begin to fire. The coolant circuit may be configured to transfer thermal power from the dedicated EGR cylinder 501d to the main cylinder block or to the battery pack 540.

Hybrid Powertrain with Selective Cylinder Deactivation

Figure 6:
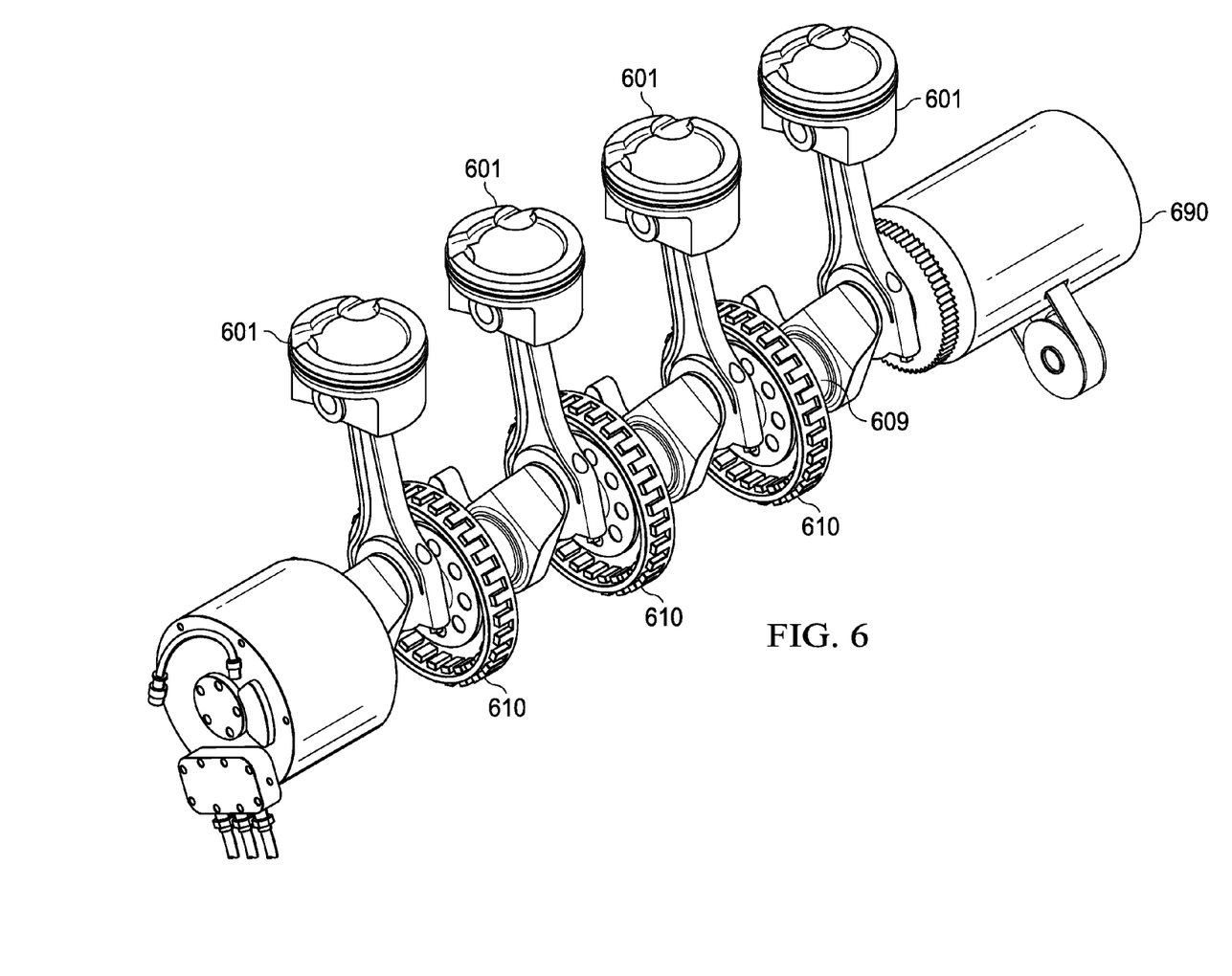
FIG. 6 illustrates a powertrain for a hybrid vehicle with dedicated EGR, with all cylinders capable of being selectively decoupled from the crankshaft.

FIG. 6 illustrates a hybrid powertrain equipped for cylinder de-coupling in a manner that any or all cylinders 601 may be decoupled from the main crankshaft 609. More specifically, instead of statically coupling to crankshaft 609, each cylinder 601 is coupled to crankshaft 609 with an electro-mechanical clutch 610.

Each cylinder 601 can operate independently from the other cylinders, and can be used as a main cylinder or as a dedicated EGR cylinder. Like the cylinders of FIG. 5, each cylinder 601 has two exhaust valves. One valve feeds a closed dedicated EGR circuit, and one feeds the exhaust system that delivers exhaust out the tail pipe.

As described above, when it is efficient for a cylinder 601 to produce dedicated EGR it operates in an "uncoupled (from the crankshaft) mode". Otherwise, the cylinder is coupled to the crankshaft 609 and used to power the vehicle's drivetrain.

As in the other embodiments described herein, an EGR control unit controls both the coupling of the cylinders and their operation. The control unit may vary each cylinder's operation depending on whether it is operating as a dedicated EGR cylinder or a main cylinder.

The clutching mechanisms 610 determine where the piston power is delivered. Using an electric hybrid drive system 680, power can be delivered mechanically to the wheels or to an electric motor/generator or both. Depending on vehicle operating conditions, cylinders 601 can be activated and deactivated, used to produce dedicated EGR or not, and used to provide power to the wheels or to an electrical system.

To balance the torque pulses at a given condition, the electro-mechanical locking mechanisms ("clutches") 610 engage to time the cylinders 601 correctly. If two cylinders are used for drive power, the clutches 610 engage in a 180 degree configuration. If three cylinders are used, they engage in 120 degree configuration. If all four cylinders are used they engage in a 180 degree configuration to balance the torque pulses going to the drive train. This configuration allows any decoupled cylinder 601 to not turn with the rest of the engine, which eliminates their friction loss compared to conventional deactivation strategies where the pistons are still moving in the bore, but not producing power.

What is claimed is:
1. A method of providing recirculated engine exhaust to an engine of a hybrid powertrain, the engine equipped with a dedicated EGR loop:
   operating at least one cylinder as a dedicated exhaust gas recirculation (EGR) cylinder, such that all exhaust of that cylinder is recirculated to the fresh air intake of the engine;

operating at least one or more cylinders as main cylinders, such that exhaust from those cylinders exits the engine to the atmosphere;

wherein the engine is operable for at least part of its operation in a decoupled mode in which the dedicated EGR cylinder is mechanically decoupled from a crankshaft of the engine;

wherein, during the decoupled mode, the dedicated EGR cylinder is operable to provide power to a generator; and wherein the main cylinders are operable exclusively to provide power to the crankshaft.

2. The method of claim 1, wherein the dedicated EGR cylinder operates with at least one of the following different from the main cylinders: bore size, bore stroke, valve timing, fuel or air-fuel ratio.

3. The method of claim 1, wherein the dedicated EGR cylinder is always decoupled from the crankshaft.

4. The method of claim 2, wherein the dedicated EGR cylinder is connected to a crankshaft of the generator during the decoupled mode.

5. The method of claim 1, wherein the dedicated EGR cylinder is coupled to the crankshaft of the engine by means of a clutch.

6. The method of claim 5, wherein the clutch is disengaged from the crankshaft of the engine when the dedicated EGR cylinder is operating at a slower speed than the crankshaft of the engine.

7. The method of claim 1, wherein the main cylinders are balanced to the crankshaft according to a number of main cylinders.

8. The method of claim 1, wherein the dedicated EGR cylinder has dual exhaust ports.

9. The method of claim 8, wherein the dedicated EGR cylinder and the main cylinders are each operable to be mechanically decoupled, and each operable as either the dedicated EGR cylinder or the main cylinder.

10. The method of claim 1, further comprising connecting the dedicated EGR cylinder to a motor, and operating the motor such that it balances torque pulses on the engine crankshaft.

11. The method of claim 1, wherein the dedicated EGR is operable to provide a thermal source for at least one of the following tasks: heating of an exhaust aftertreatment device, heating of the lubrication system, or heating of an electric storage device.

12. A powertrain for a vehicle having both an internal combustion engine and a generator, the engine equipped with a dedicated EGR loop, comprising:
    an engine crankshaft;
    at least one cylinder configured as a dedicated exhaust gas recirculation (EGR) cylinder, such that all exhaust of that cylinder is recirculated to the fresh air intake of the engine;
    one or more cylinders configured as main cylinders, such that exhaust from the main cylinders exits the engine to atmosphere;
    wherein the dedicated EGR cylinder is mechanically decoupled from the crankshaft and is mechanically connected to power the generator; and
    wherein the main cylinders are operable exclusively to provide power to the crankshaft.

13. The powertrain of claim 12, wherein the dedicated EGR cylinder has at least one of the following different from the main cylinders: bore size, bore stroke, valve timing, fuel or air-fuel ratio.

14. The powertrain of claim 12, wherein the main cylinders are balanced to the crankshaft according to a number of main cylinders.

15. A powertrain for a vehicle having both an internal combustion engine and a generator, the engine equipped with a dedicated EGR loop, comprising:
    an engine crankshaft;
    at least one cylinder configured as a dedicated exhaust gas recirculation (EGR) cylinder, such that all exhaust from the EGR cylinder is recirculated to the fresh air intake of the engine;
    one or more cylinders configured as main cylinders, such that exhaust from the main cylinders exits the engine to the atmosphere;
    wherein the dedicated EGR cylinder is coupled to the crankshaft by means of a clutch such that it may be mechanically decoupled from the crankshaft and mechanically connected to power the generator; and
    wherein the main cylinders are operable exclusively to provide power to the crankshaft.

16. The powertrain of claim 15, wherein the dedicated EGR cylinder has at least one of the following different from the main cylinders: bore size, bore stroke, valve timing, fuel or air-fuel ratio.

17. The powertrain of claim 15, further comprising means for balancing all cylinders operating as main cylinders to a rotation of the engine crankshaft.

18. A powertrain for a vehicle having both an internal combustion engine and a generator, the engine equipped with a dedicated EGR loop and an exhaust system, the powertrain comprising:
    an engine crankshaft;
    a number of cylinders;
    wherein each of the number of cylinders is mechanically connected to the crankshaft by means of an associated clutch;
    wherein each of the number of cylinders has dual exhaust ports, one port connected to the EGR loop and one port connected to the exhaust system;
    wherein each of the associated clutches is operable to couple its associated cylinder to the generator such that each of the number of cylinders is operable as a dedicated EGR cylinder with all exhaust of that cylinder directed to the EGR loop;
    wherein each of the associated clutches is alternatively operable to couple its associated cylinder to the crankshaft such that each of the number of cylinders operates as a main cylinder with all exhaust from that cylinder exiting the engine via the exhaust system.

19. The powertrain of claim 18, further comprising means for balancing all cylinders operating as main cylinders to a rotation of the engine crankshaft.

\* \* \* \* \*